United States Patent [19]
Behrle et al.

[11] Patent Number: 5,135,048
[45] Date of Patent: Aug. 4, 1992

[54] ACTIVE TEMPERATURE DIFFERENTIAL CONTROL

[75] Inventors: Rainer Behrle, Daisedorf; Harald Lenski, Ueberlingen, both of Fed. Rep. of Germany

[73] Assignee: Dornier System GmbH, Friedrichshafen, Fed. Rep. of Germany

[21] Appl. No.: 231,775

[22] Filed: Aug. 12, 1988

[30] Foreign Application Priority Data

Aug. 12, 1987 [DE] Fed. Rep. of Germany ....... 3726809

[51] Int. Cl.$^5$ ............................................. F28F 13/00
[52] U.S. Cl. ...................................... 165/96; 165/146; 165/185; 219/530; 219/540
[58] Field of Search ................... 165/185, 96, 146, 32; 219/530, 540

[56] References Cited

U.S. PATENT DOCUMENTS

| | | | |
|---|---|---|---|
| 3,225,820 | 12/1965 | Riordan | 165/96 |
| 3,391,728 | 7/1968 | Kelly | 165/185 |
| 3,965,973 | 6/1976 | Thettu et al. | 165/185 |
| 4,206,341 | 6/1980 | Leuschner et al. | 165/96 |

FOREIGN PATENT DOCUMENTS

| | | | |
|---|---|---|---|
| 2006467 | 8/1971 | Fed. Rep. of Germany | 165/32 |
| 666521 | 6/1979 | U.S.S.R. | 165/32 |

OTHER PUBLICATIONS

Gilliland, J. W., *Pulsed Liquid Cooled Heat Radiator* IBM Technical Disclosure Bulletin, vol. 17, No. 8, Jan. 1975.

*Primary Examiner*—Albert W. Davis, Jr.
*Attorney, Agent, or Firm*—Ralf H. Siegemund

[57] ABSTRACT

An apparatus is provided for maintaining a particular temperature differential and/or adjustable temperature gradient between two, possibly variant domains on a first glass, ceramic or synthetic plate, includes a first active thermal element (heater or cooling element) in contact with that plate for adjusting the temperature of a first domain; a ferrofluid, liquid metal, solder etc. droplet and made of a material that has a thermal conductivity higher than the thermal conductivity of the plate, rests on a second plate and in thermal contact therewith; a second active temperature means (heater or cooling element) on the second plate determines the temperature of the droplet; and the droplet is flattened to different degrees to thereby vary the area of contact between the top part of the droplet and the first plate.

10 Claims, 2 Drawing Sheets

ACTIVE TEMPERATURE DIFFERENTIAL CONTROL

BACKGROUND OF THE INVENTION

The present invention refers to obtaining, maintaining and/or adjusting temperature gradient and/or differential in between two different domains of a plate and having different temperatures.

Growth of gaseous phase crystals and experiments related thereto involve e.g. $HgJ_2$. Experiments of this kind pose high demands on the thermal boundary conditions of the system. During the running of the experiment such as the growing a crystal relevant crystal dimensions vary from a few mm to several cm. Thus one can readily see that the relevant thermal boundary conditions should also continue to "grow along". Specifically that means that a cooled area on which a crystal grows has to be continuously enlarged while on the other hand the environment should be maintained isotropically on a somewhat higher temperature level. To the best of our knowledge adequate solutions to that problem other than "stop gap measures" are not known.

DESCRIPTION OF THE INVENTION

It is therefore an object of the invention to provide a new and improved apparatus, device and system for maintaining an adjustable temperature gradient and/or differential in between two domains of a plate and having different temperatures.

It is a specific object of the present invention to provide a domain on a plate with relatively high temperatures, a second domain with relatively low temperatures and a variable transition area with a well defined and controllable temperature gradient and/or differential which is to be maintained for a long period of time, with the possibility in mind to change the dimensions and extensions of one domain in favor of the other or vice versa.

In accordance with the preferred embodiment of the present invention it is suggested to provide a first heating or cooling element (also called active temperature element) for adjusting, establishing and/or maintaining a first particular temperature in the domain of a plate in accordance with the object of the invention. In addition a droplet is provided having a surface of engagement and interface with the plate and containing a liquid with a thermal conductivity that is higher than the thermal conductivity of the plate. A second heating or cooling element is provided for adjusting a second temperature but now in and of the droplet.

In the preferred form the heating or cooling elements, particularly the first one, may be of annular construction or configuration and the droplet is placed in a central or middle position. In order to enhance shape stability the droplet may be maintained in a plastic skin or bag. Alternatively, the droplet may have a sufficiently high (low) surface tension so that a droplet can be maintained coherent even if its diameter exceeds 10 mm. The droplet may be comprised of a liquidous metal. The droplet could be made of a ferrofluid which is centered by means of a magnetic field.

A pump may be provided for changing the volume and quantity of liquid in the droplet to thereby vary the area of contact with the plate. Alternatively, the extent of contact by the droplets with the plate may be mechanically varied. It can thus be seen that it is the core of the invention to use a droplet of a particular fluid or liquid for controlling the thermal heat transfer into the plate and at particular variable locations. There is a geometric association between the droplet or drop and the heating or cooling sources. However, that geometry is not dictated by basic requirement but is an adjustable parameter, to adjust the process to existing conditions and to the task at hand. It is preferred that there be a radial symmetry arrangement and relationship between heating and/or cooling of the different sources such that the temperature gradient direction is symmetrical with respect to the center. The direction of that gradient can be either way, towards or away from the center. Of course this kind of symmetry obtains if the one heating or cooling element is an annulus and the other is centrally arranged thereto and together with the droplet a second domain is established right in the middle of that ring.

The utilization of a ferrofluid permits, as stated centering of the droplets through a magnetic field and maintaining its symmetry through appropriate configuration of that field. The field may be varied e.g. electrodynamically to change height as well as width (diameter) of the droplet. In addition or separately it is possible to determine the configuration of the droplets through a deformable skin made of teflon or another temperature resistant foil by means of which one retains the droplet in a particular shape. This kind of configuration will be described more fully below. Of course it is possible in principle to provide the configuration of the droplet solely through its surface tension. This obtains by example through selective waxing of the plate such that the liquid droplet is in the middle and will wet the plate but not beyond the central area. The change of surface area of contact and interface as between droplet and plate may result from changes in the droplet shape. Alternatively one can change the volume of the drop through a simple pump or the like which adds fluid to or subtracts fluid from the droplet. Alternatively the height of the droplet can be varied so that the droplet is more or less squished and that varies its width which is another way of saying that the area of contact of the droplet top with the plate above the droplet rests is varied therewith. As will be described below one may provide here a parallel guiding structure which lifts the droplet from below so that against the experiment plate the area of contact varies.

The droplet is preferably comprised of one of the following materials such as any kind of liquid metals (including ferrofluids), soft solder, gallium or mercury. The plate is made of a material having thermal conductivity that is smaller than the thermal conductivity of the droplet. Here it was found to be of particular economical advantage to use glass or another ceramic but one can also use a temperature resistant synthetic.

The invention, as stated, was developed for gas phased crystal growth and an experiment related thereto but of course the principles of the invention are applicable otherwise, namely whereever there is needed a temperature differential and/or gradient that has to be "moved" over or in relation to certain domains. As a field of interest it is of course experimentation or under microgravitation but of course mundane earthbound experiments will benefit likewise from this invention.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates equipment for carrying out experiments in the field of gas phaseous crystal growth. A post, pillar, mounting rod or the like, 10, is provided as a guide rail for two parallel guide structures or holders 11 and 12 with circular opening each being traversed by the post 10. These holders are capable of individually i.e. separately being shifted up and down in order to position certain equipment to be described next. The upper parallel guide structure 11 holds a plate 15 made e.g. of glass and assumed to be provided for supporting the experiment.

Figure 1:
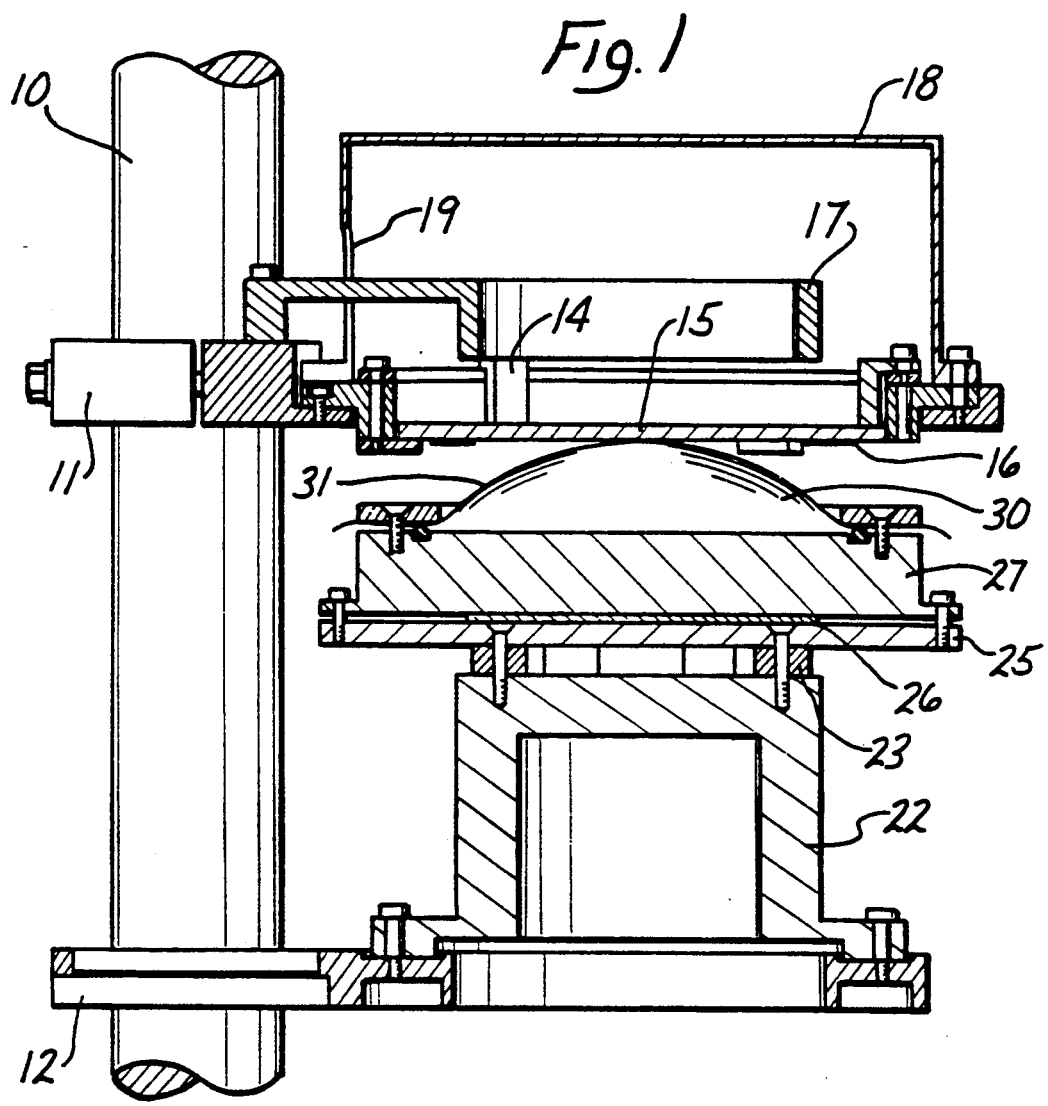
FIGS. 1 and 2 are respectively cross sections through equipment in accordance with the preferred embodiment of the present invention involving certain differences in droplet containment.

An annular heating element 16 is mounted underneath i.e. at and on the lower surface of the plate 15. A holder 17 is provided above the plate 15; this holder being provided for holding a temperature sensing device 14 an isothermal shield 18 having the configuration of a hood with an opening 19 through which the holder 17 for the thermofeeler 14 projects. This shield 18 is simply provided to reduce thermal losses and to shield the arrangement from unwanted thermal radiation from the exterior.

A mounting element 22 is provided on the lower parallel guide 12 carrying on top teflon isolation or insulation pieces 23 for purposes of carrying the support element 25 for a second heater 26 being configured as a foil heater and being attached to the bottom of another. Support device 7 which in turn carries a droplet 30 made e.g. of a liquid metal but being held together in a particular shape by a teflon skin 31. As shown, the droplet provides some but minimal contact at its peak or apex region with the bottom of plate 15. The position of contact is right in the center of a circle or ring as delineated by the annular heater 16.

The outer domain of the plate 15 is maintained at the temperature T1 as provided by the heating element 16. On the other hand the center of the plate 15 is maintained at (almost) the temperature of the heating element 26 being situated under the plate 27 that carries the droplet 30. The temperature provided by the droplet to that center region plate 15 is T2. As a consequence a temperature gradient obtains radially from the inside towards the outside because heating element 16. As stated the heating element 16 is circularly annular and the droplet is of rotational symmetry.

In the case of crystal growth conducted on top of the plate 15 the temperature T2 should be below T1. But of course this is strictly an external requirement and not an inherent one; one may radially provide a temperature gradient in the reverse (hotter on the inside and cooler on the outside). It can readily be seen that upon pushing holder 12 up, plate 15 will tend to flatten the droplet so that inherently the area of contact is increased. Consequently, the domain of plate 15 being held at temperature T2 is radially enlarged.

Figure 2:
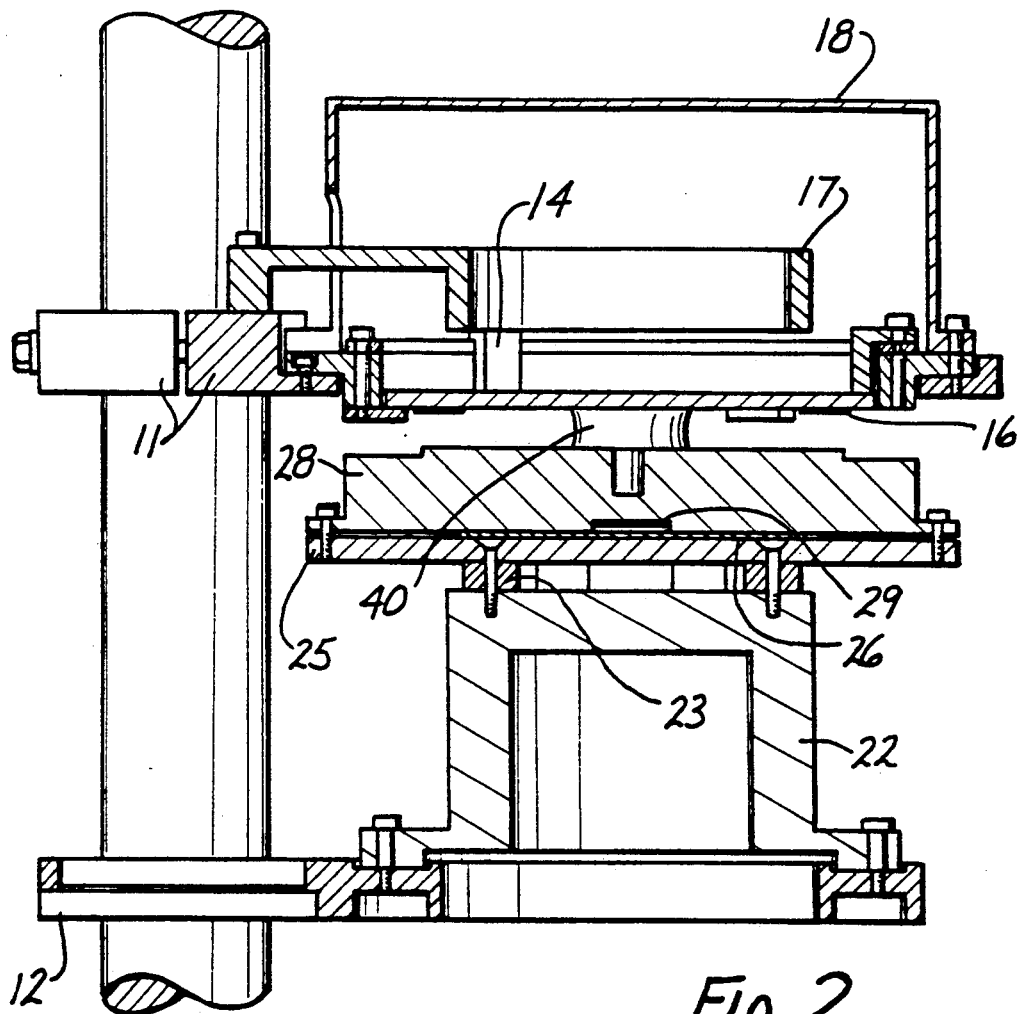

FIG. 2 illustrates a device and arrangement having many similar elements as described including elements 10,11,12,14,15,16,17,18,19,22,23,25 and 26. Element 27 of FIG. 1 has been replaced by a similar but slightly differently configured element 28. The droplet 40 in this case is composed of a ferrofluid and there is a magnet 29 being e.g. a permanent magnet which centers the droplet 40 on account of the rotational symmetry. In this example the size and height of the droplet and the area in contact with the plate can just as in the previous example be modified by changing the distance between the guide and holding element 11 and 12 in relation to each other. In other words in also this case plate 15 is moved towards plate 27 or 28 or vice versa or both. In order to increase or decrease the area of contact between the droplet 30 or 40 on one hand and plate 15 on the other hand. Considering the example and purpose of the invention as per the introduction it can readily be seen that lowering or raising of the devices 10, 11 and 12 i.e. the variation in spacing between them can be carried out continuously from tracking the growth of a crystal and commensurately changing the area of contact between the droplet and the plate 15, as shown in FIG. 3.

Figure 3:
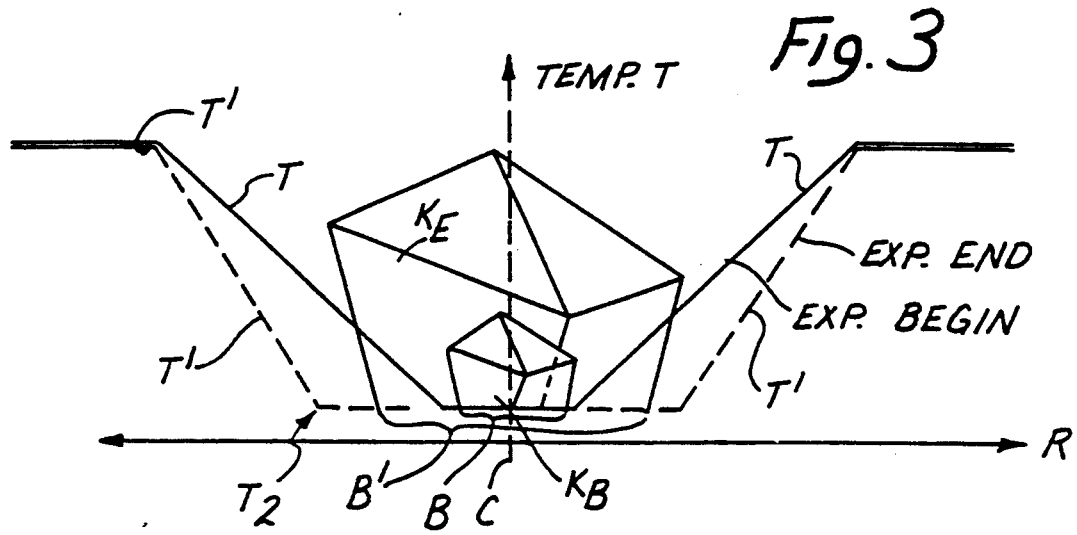
FIG. 3 is a schematic representation of the variation of temperature gradients to be obtained for the growth of the crystal.

The FIG. 3 shows a schematically temperature distribution (T) which is desirous of being obtained during a gas phaseous crystal growth experiment. The experiment is carried out on top of plate 15 (FIG. 1 or 2) and the growth is a radial one as indicated by the double arrow R with the center C. The drawn out line T shows the desired temperature distribution at the beginning of the experiment. The dotted line T is representative of the temperature distribution at the end of the experiment. K denotes the crystal which grows during the experiment whereby the two indices B and E refer to beginning and end of the configuration of the crystal. Specifically it is desired to enlarge the base of the crystal for B and B' during the geometrically congruent growth. Therefore the thermal plateau at the lower end should become larger which obtains through increasing the area of contact between the droplet (30 or 40) and the bottom of plate 15.

Figure 4:
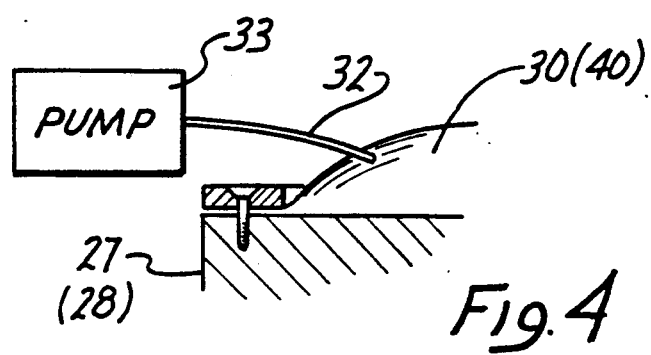
FIG. 4 shows a modification in the droplet-to-plate contact control.

FIG. 4 shows a canula 32 dipping into the fluid 30 and 40 and cooperating with a pump 33 to add or substract liquid for purposes of varying the contact area of the droplet with the plate 15.

The invention is not limited to the embodiments described above but all changes and modifications thereof, not constituting departures from the spirit and scope of the invention, are intended to be included.

We claim:

1. Apparatus for maintaining a particular temperature differential and/or adjustable temperature gradient between two, possibly variant domains on a plate of different temperature comprising: a first active thermal element (heater or cooling element) in contact with said plate for adjusting the temperature of a first domain of said plate;

a droplet made of a material having a thermal conductivity that is higher than the thermal conductivity of said plate;

means for adjusting the area of contact between said droplet and said plate; and second active temperature means (heater or cooling element) for adjusting a second temperature in and of the droplet thereof, that temperature being imparted upon a second domain of the plate and having dimensions determined by the extent of said area of contact.

2. Device as in claim 1 there being mechanical means for increasing or decreasing flatness of said droplet to thereby increase or decrease the area of contact with said plate.

3. Device as in claim 1 said droplet being made of a material so that a radial dimension of at least 10 mm can be maintained.

4. Device as in claim 1 said means including a pump for varying volume and quantity of the liquid in said droplet.

5. Device as in claim 1 said droplet being a ferrofluid there being magnet means for centering said droplet.

6. Device as in claim 1, a shape of said droplet being maintained by means of a plastic and resilient skin, shaping said droplet.

7. Apparatus as in claim 1 said droplet consisting of a material selected from the group consisting of liquid metal, soft solder, gallium, mercury.

8. Device as in claim 1 said plate being made of glass, a ceramic or a synthetic material.

9. Apparatus for maintaining a particular temperature differential and/or adjustable temperature gradient between two, possibly variant domains on a first plate of different temperature comprising: a first active thermal element (heater or cooling element) in contact with said plate for adjusting the temperature of a first domain of said plate;

a droplet made of a material having a thermal conductivity that is higher than the thermal conductivity of said plate;

a second plate onto which the droplet rests in thermal contact therewith;

a second active temperature means (heater or cooling element) on the second plate for determining the temperature of the droplet; and means for displacing the second and first plates in relation to each other to more or less flatten the droplet in between said first and second plates to thereby vary the area of contact between the top part of the droplet and said first plate.

10. Device as in claim 9 wherein said first active temperature element is of annular configuration, the droplet being situated on the center of said annular configuration, said active second element being analogously centrally disposed.

* * * * *